Figure 1:
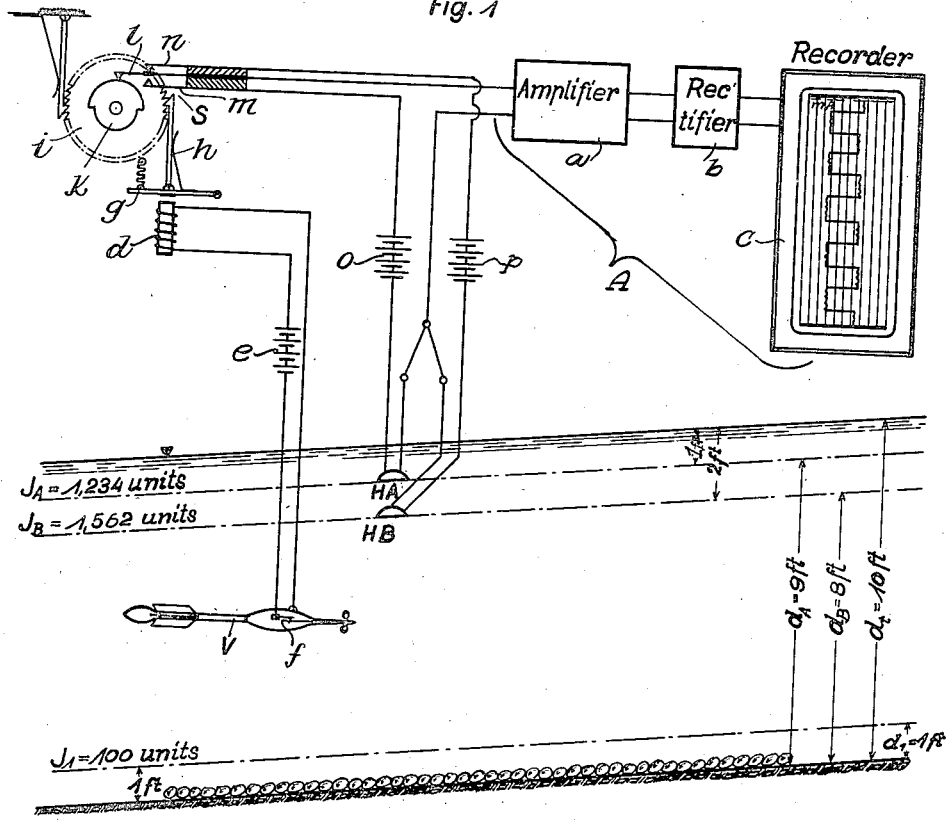

July 14, 1936.  W. TÜRK  2,047,529
DEVICE FOR MEASURING THE INTENSITY AND THE FREQUENCY OF THE
SOUND PRODUCED BY FLOWING GRAVELS IN RIVERS AND THE LIKE
Filed Jan. 22, 1934

Patented July 14, 1936

2,047,529

UNITED STATES PATENT OFFICE 2,047,529

DEVICE FOR MEASURING THE INTENSITY AND THE FREQUENCY OF THE SOUND PRODUCED BY FLOWING GRAVELS IN RIVERS AND THE LIKE

Walter Türk, Karlsruhe, Germany

Application January 22, 1934, Serial No. 707,863
In Germany January 21, 1933

1 Claim. (Cl. 73—151)

(Granted under the provisions of sec. 14, act of March 2, 1927; 357 O. G. 5)

Flowing detritus produces a noise distinctly audible even by the naked ear. The pitch of sounds of this noise varies from hollow rumbling of coarse rubbles to soft murmuring of gravel or sand. The timbre of sounds of the same is at a certain water velocity dependent on the grain size of a mixture of detritus or of the individual grain sizes of which such a mixture is composed. The intensity of this noise is determined by the quantity of detritus flowing through a determined section in the unit of time.

The taking up of the noise can be effected by a microphone lowered into the river or applied to the bottom of a ship. The microphone current having been reinforced by suitable means, for example a resistance amplifier, the noise can be heard for subjective estimation by a loudly talking apparatus or can be taken up objectively according to the methods of sound analysis by suitable devices, for example regarding its intensity by a photographic recording ammeter and regarding its pitch and timbre of sounds by a sound analysis by means of an oscillograph.

For the purpose of determination of the quantity of detritus flowing through in the unit of time the measuring instrument may be calibrated point for point in that in carrying out the measurement samples of detritus are taken at the same time and at the same place, so that a determined deflection of the ammeter can be coordinated to a determined weight of detritus flowing through a determined section in the unit of time. In order to allow the comparison of the intensities of noise taken up at different points of a river section with each other, the microphone must be suspended always at the same level above the river bed, since the intensity of the noise is dependent on the thickness of the stream of detritus.

The calibration of the device for the determination of the grain size of a detritus or of the different grain sizes of which a mixture of detritus is composed, may be carried out in such manner that in a laboratory the noises of a series of detritus of uniform or mixed composition of the grains are taken up on definite test conditions and that then according to the methods of sound analysis the spectrum appertaining to each noise is ascertained, which spectrum appears in the form of a band spectrum.

The working out of the noise taken up by the microphone regarding to intensity, pitch and timbre of the sound and its comparison with the calibration values may be carried out immediately on board of the measuring ship, or the noises may be taken up on record disks accordincg to known methods and worked out later on in the laboratory. The latter method has the advantage of such a considerable saving of time that it is possible to carry out a reliable determination of the flowing through of the detritus even at short high-water-swellings, this being impossible in known methods of measuring detritus movements.

The pitch and the timbre of the noise to be taken up are dependent not only on the grain size or sizes but also on the water velocity which therefore must always be measured simultaneously. This is effected by means of a hydrometric vane the number of revolutions of which in the unit of time gives a measure for the water velocity. The transmission and the registration of the electric impulses furnished by the hydrometric vane may be effected by superimposing these impulses on the microphone current.

Advantageously the hydrometric vane and its transmission and transformation organs are applied directly to the subaqueous microphone; for example the hydrometric vane is placed at the head of a fish-bellied weight, in the interior of which the microphone and the organs controlled by the hydrometric vane are disposed. By the described combination of the subaqueous microphone and the hydrometric vane the cables hitherto required for measuring the velocity together with the appertaining indicating instruments are spared. Owing to the synchronous registration of detritus noise and water velocity in one and the same diagram the working out can be executed particularly exactly and rapidly.

In carrying out the method in the manner above described the microphone body must be retained at a constant level above the always changing river bed. For this purpose the occasional depth of water at the measuring places must be established point by point by gaging; this necessitates always a certain waste of time. However, the method can be accelerated and carried out continuously in the following manner:

Two fish-bellied weights each of, for example, 50 kg., in which a microphone is mounted, are suspended one above another in an observation slot of the measuring ship, for example in a water depth of 1 or 2 m. respectively. Furthermore a hydrometric vane is suspended on said ship at a certain distance below the water surface. If now the ship guided by suitable ropes is yawed over the whole measuring cross section, the measuring instrument furnishes two different curves of noise intensities and the appertaining water velocities. The noise intensity being inversely proportional to the quadrate of the distance from the place of arising of the noise and thus from the detritus flowing on the bed, the two curves give the true value of the detritus noise as well as the occasional water depth for every point of the cross section. By simultaneously taking samples by a detritus catcher applied to the measuring ship a value of comparison of the detritus flow and the true noise intensity at a certain distance, for example of 1 m., from the bed is obtained. Thus, all values necessary for the measurement, namely detritus quantity, water velocity and water depth, are obtained in a single operation.

Instead of causing the impulses of the two microphones to be automatically recorded by separate intensifier aggregates, it is advantageous for an absolutely uniform intensification to send the same alternatively in short intervals of time (for example of 10 sec.) through a single intensifier. In this manner a rhythmically stepped meandrous curve of noise intensities is obtained. If now the switching-over from one to the other microphone is effected by the hydrometric vane always after a certain number of revolutions of the hydrometric vane, which is rotated by the flow of water with varying velocity according to that of the water, for example 50 revolutions, and a time signal is simultaneously recorded, for example once in each second, the appertaining water velocity can be read off by the rhythm of the steps of the curve. Moreover, a further electric stand signal can be recorded simultaneously from a lateral rope capstan at certain distances, for example of 10 m., measured from a bank of the river.

My invention has for its object a device for carrying out the measurement in this manner.

Figure 2:
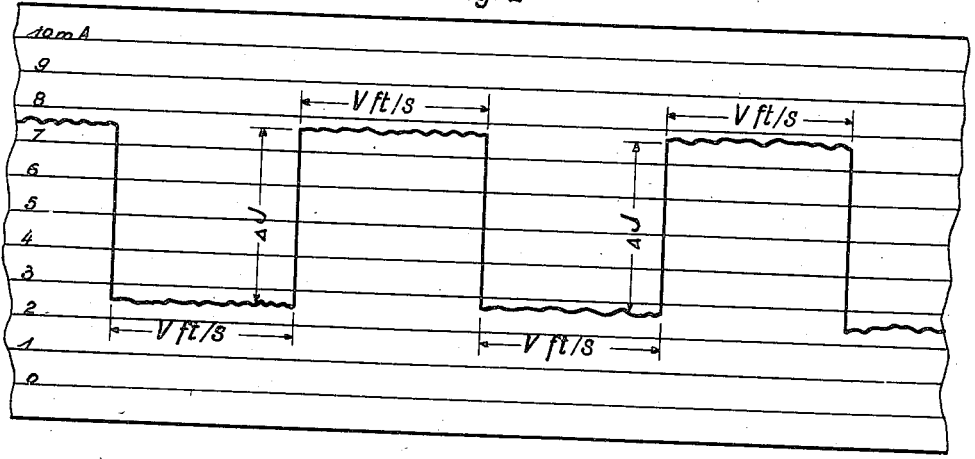

In the accompanying drawing Figure 1 shows this device and Figure 2 shows on an enlarged scale a piece of sheet provided with a meander-line by the recorder forming part of this device.

In Fig. 1 $H_A$ and $H_B$ are two hydrophones (subaqueous microphones) which are suspended on a measuring ship (not shown) at constant but different distances below the water surface and adapted to be carried by said ship across the river section to be investigated. V is a hydrometric vane also suspended on said ship and serving for measuring the water velocity. A is an electric amplifying, rectifying and recording aggregate comprising an amplifier $a$, a rectifier $b$ and a recorder $c$, and S are means operated by the vane V for periodically and alternately switching-over the hydrophones $H_A$ and $H_B$ to the aggregate A after a constant number of revolutions of the vane V. These means comprise an electromagnetic ratchet device and a contact device. Said ratchet device is constituted by an electromagnet, the coil $d$ of which is in the circuit of a battery $e$ as is also the contact device $f$ of the vane V, and the armature $g$ of which carries a pawl $h$ engaging a ratchet-wheel $i$. Said contact device comprises a cam $k$ connected to the wheel $i$ and three contact springs $l$, $m$ and $n$. $o$ is a battery, in the circuit of which are the hydrophone $H_A$, the aggregate A and the springs $l$ and $m$, and $p$ is a battery, in the circuit of which are the hydrophone $H_B$, the aggregate A and the springs $l$ and $n$.

The electric impulses furnished by the hydrometric vane V cause the pawl $h$ to rotate the wheel $i$ together with the cam $k$ in such manner that one revolution of these two parts corresponds to a certain number of revolutions of the vane V, for example 100, and always after half a revolution of the parts $h$ and $i$ corresponding to, for example, 50 revolutions of the vane V the contact spring $l$, the free end of which slides on the stepped periphery of the cam $k$, is moved by the latter so as to come out of contact with the free end of the spring $m$ and in contact with that of the spring $n$ or vice-versa. Thus, always after a constant number of revolutions of the vane V, for example 50, the microphones $H_A$ and $H_B$ are alternately switched over by the devices $h$—$i$ and $k$—$l$—$m$—$n$ to the aggregate A so that the electric impulses furnished by the two hydrophones are alternately sent through the aggregate. Consequently and as there exists a certain relation between the intensity of sound produced by the grains of gravel knocking together and the velocity of the streaming water, because the latter is the cause of the collisions of the grains, the recorder 3 produces on the record sheet a single curve in the form of a meander-line as shown in Fig. 2. The length of the singular pieces of this interrupted line indicates the velocity of water, and the distance of two adjacent pieces indicates the intensity of sound belonging to this velocity.

What I claim as my invention and desire to secure by Letters Patent is:

A device for measuring the intensity and the frequency of the sound produced by flowing gravels in rivers and the like, comprising in combination two microphones for hearing the noise produced by the flowing detritus, said microphones being suspended on a measuring ship at constant but different distances below the water surface and adapted to be carried by said ship across the river section to be investigated, a hydrometric vane for measuring the water velocity, an electric amplifying and recording aggregate, and means adapted to be operated by said hydrometric vane for periodically and alternately switching-over said microphones to said aggregate after a constant number of revolutions of said hydrometric vane.

WALTER TÜRK.